United States Patent [19]

Schatz

[11] Patent Number: 5,076,248
[45] Date of Patent: Dec. 31, 1991

[54] INTERNAL COMBUSTION ENGINE WITH PREHEATING OF THE INTAKE AIR, AND METHOD OF OPERATING THE ENGINE

[76] Inventor: Oskar Schatz, Waldpromenade 16, D-8035 Gauting, Fed. Rep. of Germany

[21] Appl. No.: 377,546

[22] Filed: Jul. 10, 1989

[30] Foreign Application Priority Data

Jul. 15, 1988 [DE] Fed. Rep. of Germany ....... 3824133

[51] Int. Cl.$^5$ .......................................... F02M 31/04
[52] U.S. Cl. ...................................... 123/556; 60/599
[58] Field of Search ................... 123/316, 552, 556; 60/599

[56] References Cited

U.S. PATENT DOCUMENTS

| 2,817,322 | 12/1957 | Miller | 123/316 |
| 2,897,801 | 8/1959 | Kloss | 123/556 X |
| 3,397,684 | 8/1968 | Scherenberg | 60/599 X |
| 3,444,845 | 5/1969 | Scheiterlein | 60/599 X |
| 3,450,109 | 6/1969 | Gratzmuller | 123/556 X |
| 4,207,848 | 6/1980 | Dinger et al. | 60/599 X |
| 4,365,606 | 12/1982 | Endo | 123/556 |

FOREIGN PATENT DOCUMENTS

| 2420822 | 11/1975 | Fed. Rep. of Germany | 123/556 |
| 2235857 | 11/1980 | Fed. Rep. of Germany | 123/556 |
| 56961 | 5/1981 | Japan | 123/556 |
| 59349 | 4/1983 | Japan | 60/599 |
| 148226 | 9/1983 | Japan | 123/556 |
| 2001128 | 1/1979 | United Kingdom | 60/599 |

Primary Examiner—Michael Koczo
Attorney, Agent, or Firm—Harness, Dickey & Pierce

[57] ABSTRACT

The compression ratio of an IC engine is reduced to the lowest value desired in the warmed-up operating state. Taking into account a given optimum combustion gas temperature function the combustion air is acted upon prior to its entry into the combustion chamber of the engine in accordance with the respective operations situation as regards temperature and/or quantity flow.

10 Claims, 3 Drawing Sheets

INTERNAL COMBUSTION ENGINE WITH PREHEATING OF THE INTAKE AIR, AND METHOD OF OPERATING THE ENGINE

BACKGROUND OF THE INVENTION

The invention relates to a method of operating an internal combustion engine such as more particularly the engine of a private car.

Private car engines have a wide field of application. They have to fulfill extreme requirements. On the one hand they have to be capable of starting at low environmental temperatures while on the other hand they have to provide a substantial power output, for example when traveling on highways, at a high speed of rotation. Normally, that is to say in the case of more than 90% of their life, private car engines are however operated at low speeds of rotation and with low loads. It is appropriate to emphasize three significant operational conditions, that is to say starting up from cold, low partial loading and full loading. These three modes differ to a very great extent as regards the combustion gas temperature shortly before and during the expansion stroke so that there are differences in fuel consumption and emission of exhaust gases. In the case of diesel engine the noise is also affected to a substantial extent.

The temperature of the combustion gas, that is to say the level and the variations in temperature with time and position, of the fuel air and fuel molecules reacting with each other in the combustion chamber, and the products of reaction thereof, termed for short the combustion mixture of combustion gases, is dependent in its decisive phase shortly before and during the expansion stroke to a great extent on the instantaneous operating temperature of the engine and more particularly on the temperature of the walls of the combustion space and on the increase in the temperature of the combustion air by the compression in the engine, and furthermore it depends on the temperature of the air on entry into the combustion chamber, and the mass relationship between the combustion air and the fuel.

The engine operating temperature depends on the instantaneous load state and on the speed of rotation, as well as on the effects of the immediately preceding operational states, as for example on whether the is trend is for the temperature to increase or to decrease.

The increase in the temperature of the combustion air by the compression of the engine is primarily dependent on the compression ratio which is normally dependent on the design, but it also depends on the operating temperature of the engine. If the operating temperature of the engine is high, then the increase in temperature caused by compression in the engine will also be high, because less heat will be given up from the combustion air and the compression pressure and thus the supply of energy from the starter and due to the moment of inertia of the engine to the combustion air will be kept at a high level. If the operational temperature of the engine is low, as for example when starting from cold, the increase in temperature due to compression will also be low. The two significant components influencing the level of the compression temperature will thus mutually increase each other.

The level and variations in the combustion air temperature directly before and during the expansion stroke are the important facts having an effect on the quality of the combustion in the engine. They determine the fuel consumption and the level of noxious exhaust gas emission and the noise output in the case of a diesel engine. Furthermore the level of, and variations in, the pressure during the expansion stroke also plays a role. Within limits the temperature and pressure variations are mutually interchangeable. That is to say a drop in the pressure has an effect similar to a drop in the temperature and vice versa.

Since the stipulation of a fixed compression ratio represents a compromise for all the operational states of the engine, the optimum combustion gas temperatures are practically speaking not adhered to in any operational state at all, because an increase in temperature of the combustion air by the engine compression, as for instance when starting from cold, is too low so that the combustion air temperatures are substantially under the optimum, while at full load the temperature increase due to the engine compression is too high and for this reason the combustion air temperatures are far above the optimum. Even in the lower partial load conditions, which are so significant in duration, the optimum combustion air temperature is hardly adhered to.

SHORT SUMMARY OF THE INVENTION

Accordingly one object of the invention is to regulate the combustion air temperature directly before and during the expansion stroke in its level and in its variations in time in accordance with the respective operational situation.

In order to achieve this or other aims in the invention in the case of an engine with a compression ratio, which is reduced to the lowest value desired in the warmed-up operating state, the combustion air is influenced taking into account a given optimum combustion gas temperature function before its entry into the combustion chamber of the engine in accordance with the respective operational situation.

In this respect the temperature of the combustion air and/or its quantity flow may be influenced. Different air fuel ratios are known more especially in the case of diesel practice and thus constitute one control variable. However in the case of a gasoline engine, which normally is operated with fixed air to fuel ratio within the range of the stoichiometric fuel ratio, it is possible for a systematic regulation of the air to fuel ratio to be desired in connection with emission and fuel consumption, as for in instance in the case of so-called lean engines, which are run with a substantial air excess.

The advantage of this method is that the exhaust gas emission and the fuel consumption are improved in all operational situations. Furthermore the torque and the maximum power may be als reduced. In the case of a diesel engine the ability to start from cold is improved and noise on starting from cold and in the heating up phase is improved. More particularly, the emission of solid particles is reduced, since in accordance with the invention in operational situations with otherwise excessive exhaust gas temperatures of operation the increase in temperature of the combustion air is reduced by the low compression ratio and in operational situations with otherwise excessively low operational temperatures the temperature of the combustion air is increased and thus the respective optimum is approached.

In the case of a gasoline engine the tendency to knock at low speeds of rotation is reduced since the temperature of the incoming combustion air is reduced by the lower compression ratio.

The combustion air temperature or the variations in temperature with respect to time and space, of the combustion air and the fuel molecules and their reaction products during their sojourn in the combustion chamber of the engine is not a static quantity, but a dynamic one subject to extreme changes. On entry into the combustion chamber at the start of the induction stroke, that is to say at the inlet temperature, the molecules have their lowest temperature. In the course of the compression stroke the temperature will considerably increase and will again undergo an abrupt increase during combustion. During the working stroke the temperature decreases and on leaving the combustion chamber will reach the value termed the exhaust gas temperature. In this respect different temperatures will be registered at different parts of the combustion chamber.

For the quality of combustion and thus for determining consumption of fuel and the emission of exhaust gas the variation in temperature in the high temperature range, that is to say shortly before and during the expansion and working strokes, is decisive. In this respect three characteristic temperatures are significant:

the terminal compression temperature, which affects formation of the mixture and the formation of HC's and of soot, the combustion temperature, which substantially affects NOX formation, and the working gas temperature, which affects oxidation of components of the fuel (HC and soot) which have so far not burned.

Stated in an oversimplified manner, it is a question of the combustion gas temperatures directly before, during and after the combustion.

In comparison with the conventional change in combustion air temperatures it would be desirable for the terminal compression temperature to be kept at a high level in order to improve the preparation of the mixture and thus to keep the formation of soot and of unburned hydrocarbons low. The combustion temperature should be reduced more especially in the case of an engine in the warmed-up state in order to keep NOX formation at a low level. More especially in the case of the engine in the cold condition and when the load is low the working gas temperature should be kept high in order to deal with unburned hydrocarbons and soot.

The treatment in accordance with the invention of the combustion air before it enters the combustion chamber of the engine may be achieved by acting on the variations in temperature in the combustion chamber. In this respect the different conditions in diesel and gasoline engines are to be taken into account.

It is for instance possible when starting a diesel engine from cold to reduce the excess of fuel required for ignition by increasing the compression temperature, by heating the combustion air and the earlier variation in temperature connected therewith. As a result less soot and unburned hydrocarbons are developed. The higher compression temperature means furthermore that the ignition lag is reduced so that at the point of ignition a smaller amount of fuel is caused to explode with the result that the combustion temperature, the combustion pressure and NOX formation are decreased.

The working gas temperature increases in this example to the same degree as the terminal compression temperature increases, this also having favorable effects on emission, because the soot formed is in part disposed of.

On the other hand in the partial load range, for instance and at the same terminal compression temperature, the combustion temperature and working gas temperature may be raised if the air excess is reduced, as for instance by choking. Even in the case of a low ambient temperature there is a useful purpose to be served if the quantity flow of the combustion air is reduced.

In the case of a gasoline engine the decrease in the compression on starting from cold and under partial load conditions entails an impairment of combustion, which may be compensated or overcompensated by heating the combustion air. In the event of there being an overcompensation it is possible to increase the air coefficient and to obtain the advantages in the exhaust gas emission and in the fuel consumption.

Thus it is a convenient feature of the invention to heat the combustion air in the case of a gasoline engine for starting from cold and/or when running under partial load conditions, the air coefficient best being increased as well.

In accordance with a convenient feature of the invention the temperature of the combustion air is affected by heat exchange. In this respect the temperature of the combustion air may be affected by return of dissipated heat from the engine by heat exchange, the heat exchanger being for instance supplied with heat dissipated from the radiator water of the engine. Alternatively or in addition the heat exchanger may be supplied with heat dissipated from the engine exhaust gas.

In accordance with a further convenient development of the invention the heat dissipated from the engine may be supplied to the combustion air indirectly via a heat storage means, more particularly a latent heat storage means so that even when starting from cold there will be heat for heating the combustion air.

In accordance with a particularly preferred form of the invention the combustion air flow is split up in to a part moving through a heat exchanger and a part flowing through the heat exchanger and the temperature of the combustion air is affected by regulation of the two quantity flow parts.

The increase in the combustion air temperature prior to its entry into the engine may be effected with the aid of a charger as well. In addition to the increase in temperature on starting up a diesel engine it is also desirable to have an increase in the quantity of air connected with the use of the charger, because then more fuel is able to be burned and thus the starting operation may be shortened.

By choking the charger it possible to achieve a further increase in temperature. The choking effect may be adjustable.

If the charger is only to be employed as an aid to starting a diesel engine, the displacement charger may be put out of operation after the end of the starting up phase, the drive of the charger being for example interrupted for this purpose or the air outlet of the charger may be connected with the atmosphere after the end of such starting phase.

In accordance with a particularly advantageous form of the invention the phase relationship of a charger for direct post-charging is set to maximum charging effect during starting and in the other operational states it is adapted to the desired combustion gas temperature.

If a charger is to be used for increasing the torque and/or the power, then regulation of the combustion gas temperature is possible within the entire operational range by varying the air quantity flow, for example by putting the charger into operation, possibly with a choking effect which may be a variable one.

If the charger employed is a displacement one, whose phase relationship is such that it may be synchronized with the engine piston motion, then in accordance with an advantageous development of the invention the method as described for instance in the European patent 126 465 is used such that there is a direct post-charging with a change in the phase relationship for the regulation of the quantity flow and/or of the compression temperature.

In the case of the use of direct post-charging in a diesel engine on starting up, the phase relationship may be set to be at maximum charging effect so as to obtain high air quantity flows and corresponding increases in the combustion air temperature. These conditions, which are advantageous when starting up, may be still further enhanced by heating the combustion air with heat from a heat storage means. With progressive heating of the engine the charging power and the heating of the combustion air will then be adapted to the respective operational state.

In the case of low partial loads, for instance, the charger power will be substantially reduced and the heating of the combustion air will be maintained in the adapted state, while in case of full load of the engine the charger power and the air quantity will be maximized and the air heating means will be turned off or replaced by charger air cooling.

It is more especially in the case of a gasoline engine that it possible to provide for a useful effect on the combustion air before same enters the combustion chamber by heating the combustion air when under partial load in order to reduce the quantity of air and the charge changing work.

Preferably the heating of the combustion air is combined with the so-called Miller technique, in which by premature closing of the inlet quantity regulation is performed and thus at the same time an expansion and cooling of the combustion air. This cooling may increase the noxious exhaust gas emission. By preheating the combustion air this effect is counter acted and at the same time there is an additional benefit as regards charge changing work.

In accordance with a preferred embodiment of the invention the end of the starting up phase and of the warming up phase is indicated as soon as a given temperature is reached in the vicinity of the combustion chamber. This indication may be in the form of a control pulse, which renders the charger non-operational or enables changes to be made in the phase relationship as compared with the starting setting or the warming up setting and may if required suitably modify a combustion air heating means provided alternatively or in addition.

In the case of a diesel engine there is the characteristic metallic combustion noise, which is also termed cold-start noise, in the starting up phase while the temperature is still low. This phenomenon is thus an indication that the starting phase is still progress. It is thus possible to utilize a knock sensor which at the end of the cold start noise provides a control signal indicating the end of the starting phase.

As part of another convenient form of the invention the end of the starting phase may be indicated by a timer triggered at the beginning of the start up.

In order to sense the end of the starting phase it is also possible to measure the combustion air temperature before the air is admitted to the combustion chamber, or the temperature of the exhaust gas.

In order to reduce the compression of an existing engine the combustion chamber may be increased in size without the displacement being affected; the end of inlet may be reset to take place at a later point in time so that the effective displacement is reduced during compression; and it is possible for the displacement to be reduced while leaving the combustion chamber unaltered, as for instance by reduction of the piston stroke. All three possibilities may be combined together, they differ greatly as regards their effects on the process. However in accordance with a particularly advantageous form of the invention when the method is applied to a given engine in order to reduce the compression ratio to the desired value the end of inlet is reset to a later point in time.

In order to take advantage of the useful effects of the method of the invention it is necessary to have available an engine with a compression ratio which is reduced to be below the normal values therefor in gasoline and diesel engines. The compression ratio is a cardinal design feature of an engine. The development of new engines requires many man-years. It is more especially the design of the combustion chamber which represents the result of years of optimization work. Anything having an effect on the geometry of the combustion chamber is thus to be avoided as far as possible in order to avoid the necessity of renewed time consuming development work. In order to apply the method of the invention, it would admittedly also be possible, by reducing the piston stroke, to reduce the compression ratio, without then involving a change in the combustion chamber geometry. However on the expansion side this would sacrifice stroke length and thus depart from the essential properties of an engine which may have taken years to develop.

By retiming closure of the inlet it is possible to decrease the effective compression ratio without then having any undesired effect on the valuable features of a successful engine. The difference between the volume swept by the piston during expansion and the smaller volume swept by the piston during compression it possible to use additional expansion energy.

Although it is true that the retiming of the end of inlet in IC engines is a well known expedient, it has so far only been adopted in order to vary the torque-speed characteristic of a gasoline engine and the reduction in the compression ratio was accepted as an unavoidable disadvantage which had to be tolerated and which might increase the fuel consumption. Normally the opening of the outlet is advanced in this case so that the compression stroke and the expansion stroke are generally kept unchanged. In a diesel engine the compression ratio may in any case not be modified owing to the requirement during starting from cold.

In contradistinction to this the proposal of the invention is to retime the closure of inlet to come to a later point in time specifically because of the so far undesired reduction in the compression ratio in order in this way to take advantage of the useful effects of the invention in the case of a given engine, which has proved to be successful, without any unfavorable effects.

If a pre-existing engine design is not taken as a starting point, then an engine for performing the method of the invention may be so designed that the effective compression stroke as set by the closing of the inlet is substantially smaller than the effective expansion stroke as defined by the opening of the outlet. Within the possibilities for the geometrical displacement it is an advantage if the geometrically available displacement is used for the expansion stroke so that the combustion chamber volume may be kept smaller in size, this offering advantages in the partial load range.

In order to prevent losses of the heat transmitted to the combustion air, the air manifold supplying the combustion air to the engine cylinders is preferably designed with a reduced thermal capacity. It may be thermally insulated and, for instance, be in the form of a double-walled sheet metal structure, the space between the two walls being evacuated if desired.

Working embodiments of the invention will now be described in more detail with reference to the drawings.

LIST OF THE SEVERAL VIEWS OF THE DRAWINGS

DETAILED ACCOUNT OF WORKING EMBODIMENTS OF THE INVENTION

Figure 1:
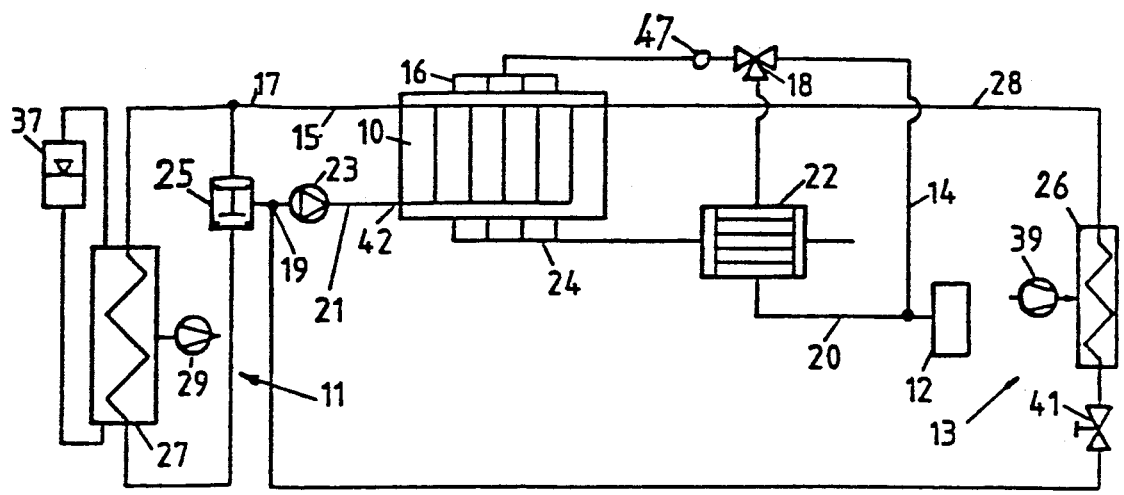
FIG. 1 is a diagrammatic view of a simple arrangement for performing the method of the invention.

In the ensuing account like parts in the different figures are denoted by like reference numerals.

All figures diagrammatically show a four cylinder engine 10 in conjunction with a cooling system 11 and a heating system 13, the coolant circulating in a coolant circuit generally being referenced 15 and subdivided into a radiator circuit 17 and a heating circuit 28, for supplying the radiator system 11. The radiator circuit 17 and the heating circuit 28 unite at 19 form a return duct 21 leading back to the engine 10 and comprising a coolant pump 23 and opening at 42 into the engine 10.

The cooling system 11 comprises an engine thermostat 25, the radiator 27 with a radiator fan 29 and a compensating vessel 37. The arrangement illustrated is of a well known type and not explained in detail here. The heating system 13 comprises the heating means or, respectively, the heating heat exchanger 26, a heating blower 39 and a regulating valve 41.

The engine 10 is supplied with combustion air via an air filter 12, there being for this purpose an air induction duct 14 leading from the air filter 12 to an air manifold 16. The air manifold 16 is preferably designed so as to have a reduced thermal capacity. In this respect a material with a relatively low specific thermal capacity may be employed. Furthermore, the air manifold 16 may be thermally insulated. In accordance with a preferred design it may for instance be the form of a double walled sheet metal structure and it may be evacuated if desired.

In FIG. 1 a three way valve 18 is arranged downstream from the air filter 12 in the air induction duct 14 and from this valve the air induction duct 14 is continued to the air manifold 16. Furthermore a branch duct 20 opens into the three way valve 18 and downstream from the air filter this duct 20 branches from the air induction duct 14 and has a heat storage means 22 placed thereon. The heat storage means 22 has a double duct system, the one part of this duct system having the combustion air in the branch duct 20 flowing through it, while the other duct system is supplied with the hot exhaust gases for heating the heat storage means 22. The exhaust gases are supplied to the heat storage means 22 via an exhaust gas manifold 24, which downstream from the heat storage means 22 opens into the surroundings via the exhaust gas system.

Figure 2:
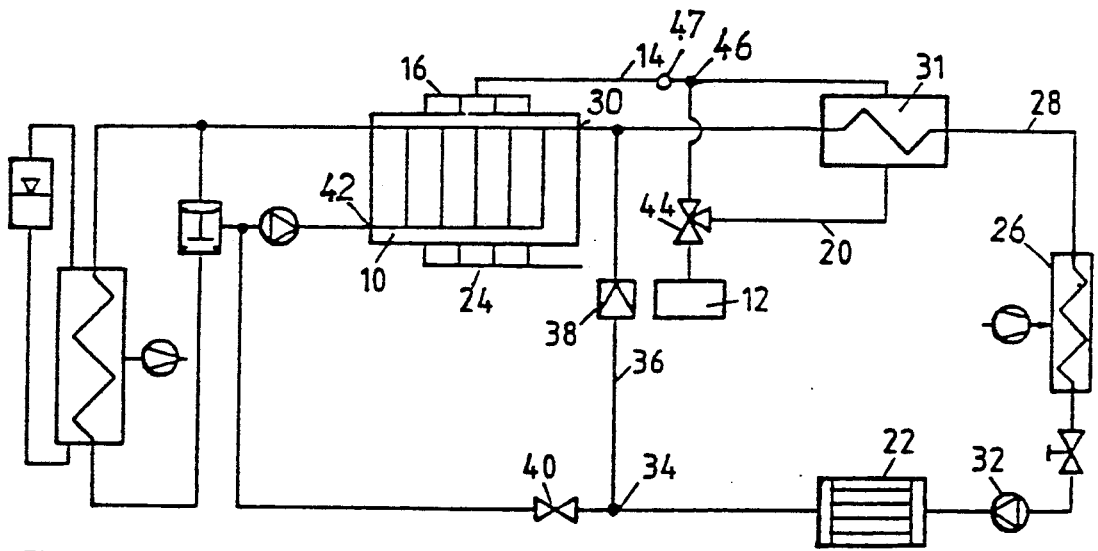
FIG. 2 is a diagrammatic view of an arrangement for performing the method of the invention with a water-air heat exchanger and with the inclusion of the vehicle heating system in the context of an air regulated embodiment of the combustion air heating system.

FIG. 2 shows an arrangement which does without a heat storage means having a double duct system. The hot coolant leaves the engine 10 at 30 and goes into the heating circuit 28 and is firstly caused to pass through a water air heat exchanger 31, whence it flows through the vehicle heating system 26 and then passes via a pump 32 into the heat storage means 22. Following the heat storage means the heating circuit has a branch 34 leading into a bypass 36, which bypasses the engine and rejoins the heating circuit 28 upstream from the heat exchanger 31 and which is furthermore provided with a check valve 38. Downstream from the branch 34 in the coolant circuit 28 there is a shut off valve 40 which is able to halt the return flow of the coolant at 42 into the engine 10 and thus to cause the coolant to flow via the bypass 36.

The air manifold 16 is connected with an air induction duct 14, which adjoining the air filter 12 has a three way valve 44, from which the branch duct 20 passes via the heat exchanger 31 and at 46 rejoins the air manifold duct 14.

When the engine is started up from cold the shut off valve 40 is shut so that the pump 32 supplies the coolant in a shortened circuit from the heat storage means 22 via the bypass 36 through the heat exchanger 31 to the vehicle heating system 26, whence it is again passed through the heat storage means 22 in order to supply further heat to the heat exchanger 31 and to the vehicle heating system 26.

As soon as the engine has attained a sufficient operational temperature, the shut off valve 40 is opened, following which the pump 32 then causes the coolant to move through the engine 10 owing to the resistance of the check valve 38 and from the engine it flows via the heat exchanger 31 and the vehicle heating system 26 back to the heat exchanger 22, which in this manner may be charged by the hot coolant.

When starting up from cold the three way valve 44 is so set that the combustion air flows via the branch duct 20 and thus through the heat exchanger 31 so that the engine 10 is supplied with hot combustion air. If heating of the combustion air is not necessary, the three way valve 44 is reset and the combustion air is supplied straight from the air filter 12 via the air induction duct 14 to the air manifold 16.

Figure 3:
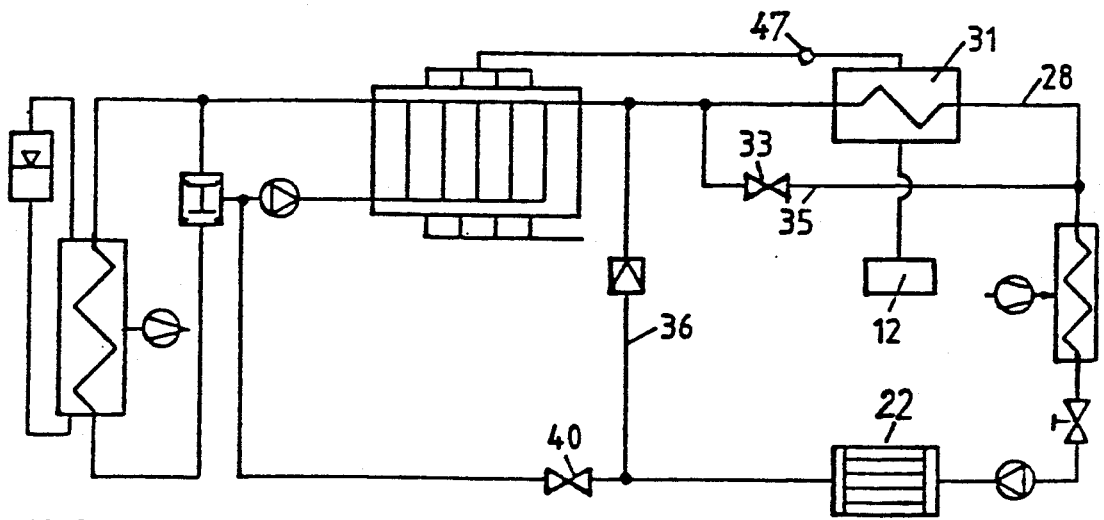
FIG. 3 is a view similar to that of FIG. 2 showing a water regulated design.

In the arrangement shown in FIG. 3, which apart from the omission of the branch duct 20 is the same as the design of FIG. 2, the regulation of the heating of the combustion air is not effected by the selective switching over of the air supply system to the branch duct 20 but by causing the coolant coming from the engine 10 via the bypass 35 to bypass the heat exchanger 31 or by causing the coolant to flow through the heat exchanger 31 after closing of a choke 33 in the bypass 35.

Figure 4:
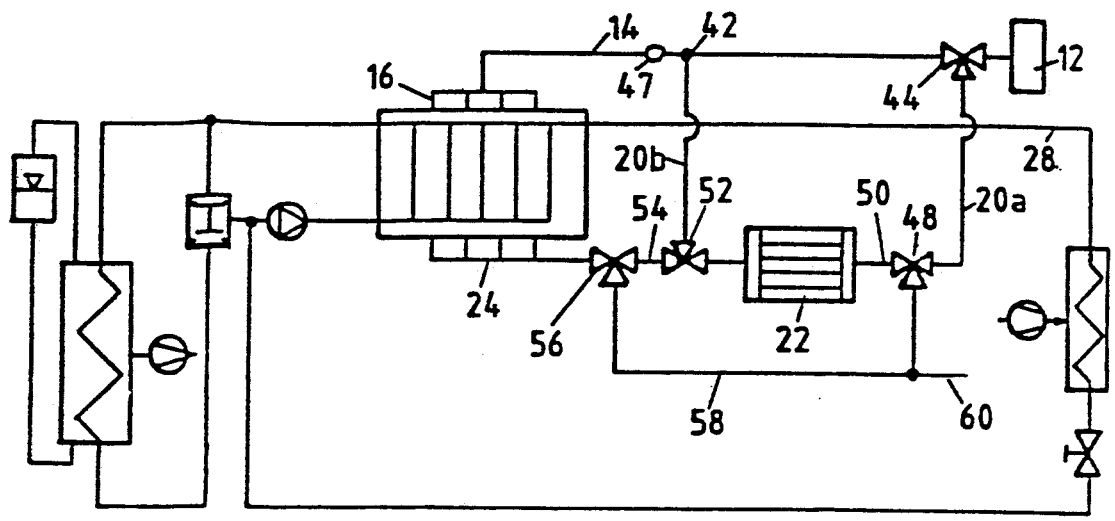
FIG. 4 is a diagrammatic view of an arrangement for performing the method of the invention with a heat storage means adapted to be heated by the exhaust gases.

FIG. 4 shows an arrangement in which the heat storage means also only has one duct system, which however selectively for heating the heat storage means by the engine exhaust gas or for heating the combustion air may have the latter flowing through it. Adjoining the air filter 12 there is a three way valve 44 from which the air induction duct 14 leads straight to the air manifold 16. A branch duct 20a runs from the three way valve 44 to a three way valve 48 which is connected with a further three way valve 52 via a duct 50. In this respect the duct 50 extends through the heat storage means 22. Adjoining the three way valve 52 there is a branch duct 20b which at 42 opens into the air induction duct 14. Furthermore the three way valve 52 is connected via a duct 54 with a three way valve 56 which is furthermore connected with the exhaust gas manifold duct 24. The two three way valves 48 and 56 are connected together by a duct 58 bypassing the heat storage means 22 and which is connected with the exhaust system 60.

When starting up from cold or, respectively, when there is a requirement for heating of the combustion air the three way valves 44, 48, 52 and 56 are so set that the combustion air drawn in via the air filter 12 is caused to flow via the branch duct and the duct 50 via the heat storage means 22 and from this via the branch duct 20b into the air induction duct 14, while the engine exhaust gases are caused to flow from the exhaust manifold duct 24 at the three way valve 56 into the duct 58 and thus to the exhaust gas system 60. If heating of the combustion air is not required, the three way valves 44, 48, 52 and 56 are switched over so that the combustion air entering via the air filter 12 is able to flow straight into the air induction duct 14. At the same time the exhaust gas is passed at the three way valve 56 into the duct 54 and passes via the three way valve 52 into the duct 50 so that the exhaust gas is used for heating the heat storage means 22 and only passes later at the three way valve 48 into the duct 58 and thence to the exhaust system 60.

Figure 5:
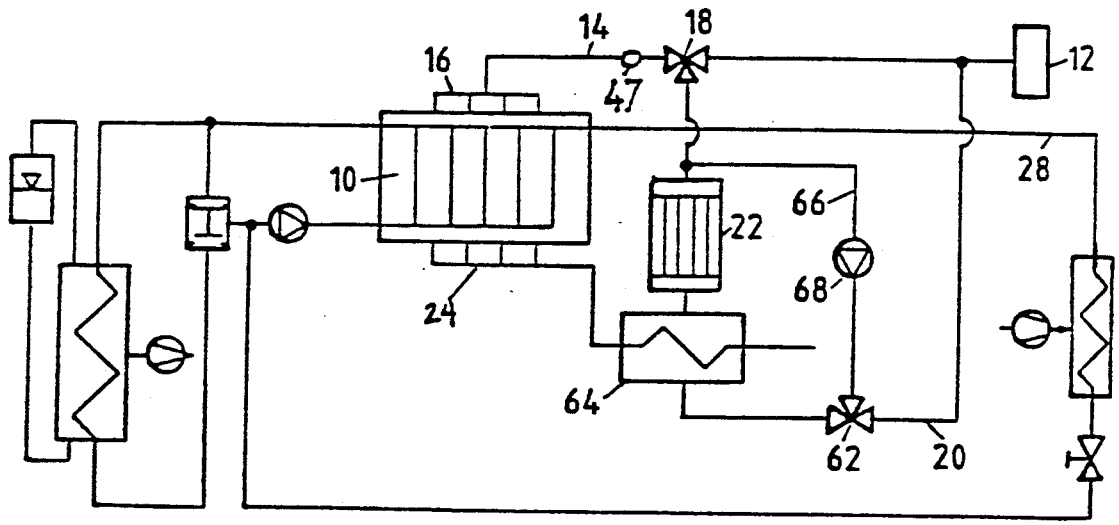
FIG. 5 is a diagrammatic view of an arrangement for performing the method in accordance with the invention with a heat storage means to be indirectly heated by the exhaust gases.

FIG. 5 shows an arrangement in which the heat storage means 22 is also heated by the engine exhaust gas, the heat storage means however only having one duct system, since the heating of the heat storage means 22 in this case takes place indirectly using an air circuit taking up heat from the exhaust gas.

In FIG. 5 the air induction duct 14 runs directly from the air filter 12 to the air manifold 16 on the engine 10. Downstream from the air filter 12 a branch duct 20 is connected, which leads to an exhaust gas air heat exchanger 64 and thence back via the heat storage means 22 and the three way valve 18 to the air induction duct 14. The exhaust gas manifold duct 24 also passes via the exhaust gas air heat exchanger 64. A return duct 66 branches off selectively between the heat storage means 22 and the three way valve 18 from the branch duct 20. This return duct 66 runs via a blower 68 to a three way valve 62 arranged downstream from the heat exchanger 64.

When starting up from cold or if there is a need for preheating the combustion air for some other reason the three way valve 18 is so set that the combustion air drawn in via the air filter 12 flows through the duct 20 and thus the exhaust gas air heat exchanger 64 and the heat storage means 22 and then via the three way valve 18 flows into the air induction duct 14 and via the air manifold 16 to the engine 10.

Figure 6:
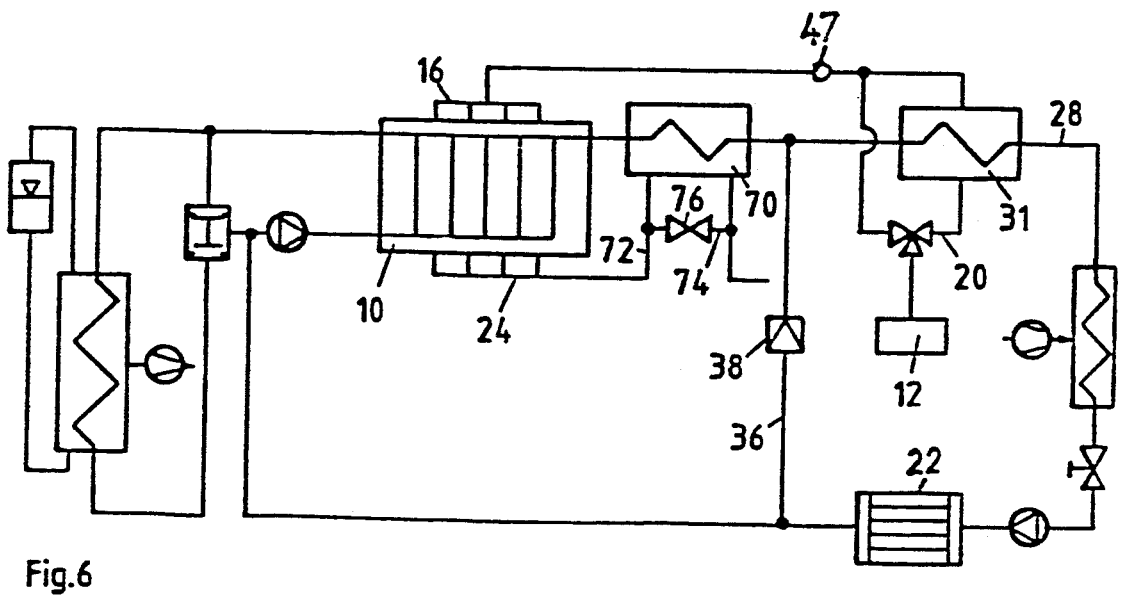
FIG. 6 is a diagrammatic view of an arrangement for performing the method of the invention with a heat storage means able to be indirectly heated by the coolant and indirectly by the exhaust gases.

As soon as preheating of the combustion air may be dispensed with, the three way valves 62 and 18 are so reset that the combustion air flows straight from the air filter 12 via the air induction duct 14 to the air manifold 16, whereas on the other hand the three way valve 62 leads to a closed air circuit which runs via the exhaust gas air heat exchanger 64, the heat storage means 22 and the blower 68. The blower is put into operation in this setting and maintains an air circuit via the return duct 66, the exhaust gas air heat exchanger and the heat storage means 22 so that the air circulating in this circuit and heated in the exhaust gas air heat exchanger 64 heats the heat storage means 22. FIG. 6 shows a further possible design of a system in which the heat storage means 22 is able to be heated on the one hand by the coolant and on the other hand indirectly by the exhaust gas.

The system in accordance with FIG. 6 is generally similar to the system to be seen in FIG. 2 but however it does include an exhaust gas water heat exchanger 70 placed in the heating circuit 28 in the duct branch, leading from the engine 10 to the water air heat exchanger, upstream from the opening of the bypass 36. This heat exchanger 70 has coolant flowing through it all the time. The exhaust gas duct 72 extending from the exhaust gas manifold 24 also runs via the exhaust gas water heat exchanger 70, but it has a bypass 74 for this exhaust gas water heat exchanger 70. This bypass 74 is provided with a shut off valve 76.

So long as the coolant has not yet reached the necessary operational temperature, by closing the shut off valve 76 it is possible to cause the hot exhaust gases to flow through the exhaust gas water heat exchanger 70 so that the exhaust gases then give up additional heat to the coolant. As soon as additional heating of the combustion air by the exhaust gas is no longer required, the shut off valve 76 is opened so that the exhaust gases may bypass the heat exchanger 70.

Figure 7:
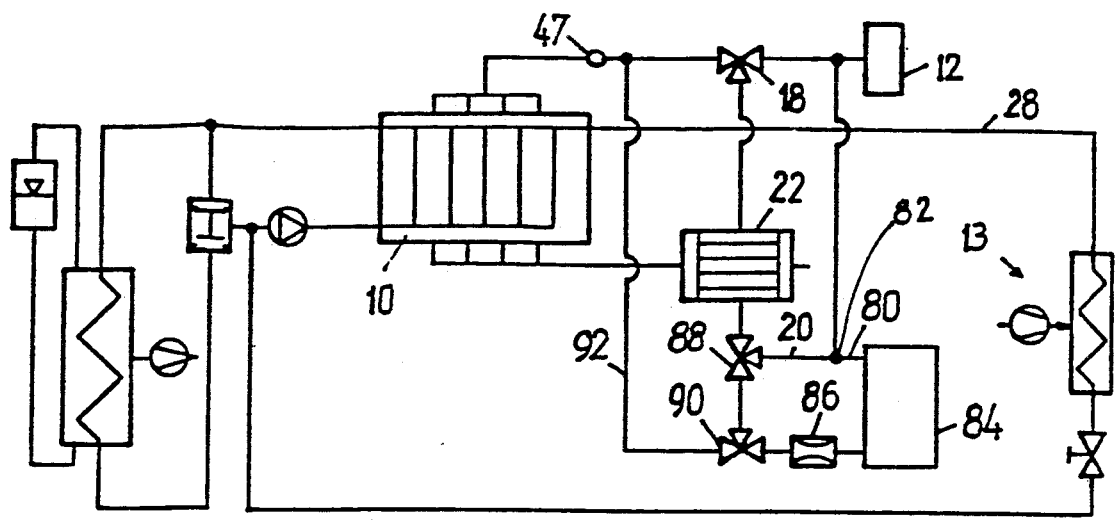
FIG. 7 is a diagrammatic showing of an arrangement like that of FIG. 1 with a charger and a choke placed downstream therefrom.

The arrangement of FIG. 7 differs from the arrangement in accordance with FIG. 1 inasmuch as there is a further branch duct 80 arranged parallel to the branch duct 20 and which branches off at 82 upstream from the heat storage means 22 and leads to the input side of a charger 84. From the output or pressure side of the charger 84 the branch duct 80 returns via an adjustable choke 86 to the branch duct 20 into which it opens via a three way valve 88 upstream from the heat storage means 22. Between the choke 86 and the three way valve 88 there is a further three way valve 90, from which there extends a duct 92, bypassing the heat storage means 22, and opening directly downstream from the three way valve 18 into the air induction duct 14.

This arrangement makes it possible to pass the combustion air straight from the air filter 12 into the air manifold 16 or, after resetting the three way valve 18, to cause the combustion air to flow via the branch duct 20. In this case the combustion air is caused to flow, in accordance with the setting of the three way valve 88, either directly via the heat storage means 22 or via the charger 84. After leaving the charger 84 the temperature of the combustion air may be additionally increased in a way dependent on the setting of the choke 86. If a further heating up should be necessary, the three way valve 90 is so set that the combustion air coming in via the charger 84 is caused to flow via the heat storage means 22. In other cases it is possible for the combustion air to be passed via the duct 92 straight to the air induction duct, the heat storage means 22 being bypassed.

In a similar manner the combustion air from the charger 84 may also be selectively passed through a heat exchanger supplied with heat dissipated by the engine for further heating of such combustion air.

Figure 8:
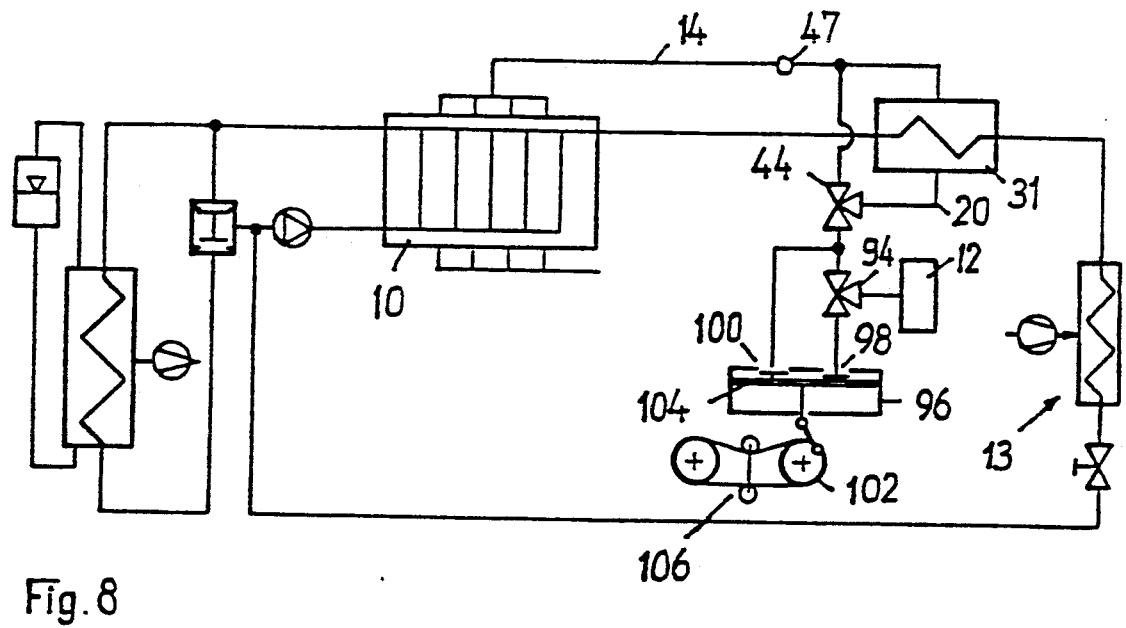
FIG. 8 is a diagrammatic view of the arrangement for performing the method of the invention in the case of a diesel engine.

FIG. 8 shows an arrangement specifically designed for diesel engines. The combustion air drawn in via the air filter 12 is caused by a three way valve 94 to flow either directly to the three way valve 44 (which as in the arrangement of FIG. 2 passes the combustion air either directly via a heat exchanger 31 or directly to the air induction duct 14) or firstly to the input side of a piston charger 96, which is provided with a check valve 98. By the same token the pressure side of the piston charger 96 is also fitted with a check valve 100. The pressure side of the piston charger 96 is connected between the three way valves 44 and 94 with the air induction duct so that the combustion air arriving from the charger 96 is able to be caused selectively to flow via the heat exchanger 31 or may bypass it.

The drive of the piston charger 96 is by way of a belt 102 from the crank shaft of the engine so that the piston 104 of the charger is moved in synchronism with the pistons of the engine 10. The phase relationship of the charger piston 104 to the engine pistons may be varied by a conventional setting device 106, which is able to change the ratio between the lengths of the driving and driven runs of the belt. A change in the phase relationship between the charger and the engine causes a change in the phase relationship between the timing of the opening of the engine cylinder to be charged and the pumping stroke of the charger, and thus the amount of the combustion air passing into the engine cylinders and compressed by the charger is varied.

In order to measure the temperature of the combustion air flowing to the engine 10 there is temperature measuring device 47 arranged in the air induction duct 14 downstream from the device (which serves for heating the combustion air). The output of the device 47 is connected with a regulating system (not shown) for generally regulating the engine in order for instance to regulate the excess addition of fuel or the timing of ignition or injection.

I claim:

1. A method for operation of an internal combustion engine, said engine including a circulating coolant system divided into a radiator circuit, having coolant flowing between a radiator and the engine, and a heating circuit, having coolant flowing between a vehicle compartment heating means and the engine, the method comprising:

passing hot coolant through said heating circuit;
   passing said coolant through a heat exchanger means operatively coupled with said heating circuit;
   drawing combustion air into said engine;
   selectively passing said combustion air through said heat exchanger means to provide said combustion air at a given optimum temperature prior to entry into a combustion chamber of the engine in accordance with the respective operational situation.

2. The method as claimed in claim 1, wherein in the case of a gasoline engine starting up from cold or under partial load the combustion air is heated.

3. The method as claimed in claim 1, wherein the temperature of the combustion air is acted upon by heat exchange.

4. The method as claimed in claim 3, wherein the temperature of the combustion air is acted upon by return of heat dissipated from the engine by heat exchange.

5. The method as claimed in claim 4, wherein heat dissipated from the cooling water of the engine is supplied to the heat exchanger.

6. The method as claimed in claim 4, wherein the heat dissipated from the engine is indirectly supplied via a heat storage means to the combustion air.

7. The method as claimed in claim 6, wherein the heat dissipated by the engine is indirectly supplied via a latent heat storage means to the combustion air.

8. The method as claimed in claim 3, wherein the current of combustion air is divided up into a part moving through a heat exchanger and a part bypassing the heat exchanger and the temperature of the combustion air is acted upon in both parts by regulation of the ratio of the quantity flows.

9. The method as claimed in claim 1 for the operation of a gasoline engine wherein in the partial load operational rang the influence of the amount of combustion air is performed by heating of the combustion air.

10. An internal combustion engine with a compression ratio which is reduced to its lowest desired value at warm up operational conditions comprising:

said engine including a circulating coolant system divided into a radiator circuit, having coolant flowing between a radiator and the engine, and a heating circuit, having coolant flowing between a vehicle compartment heating means and the engine;
   means for passing hot coolant through said heating circuit;
   heat exchanger means for enabling said coolant to pass therethrough, said heat exchanger means operatively coupled with said heating circuit;
   means for drawing combustion air into said engine;
   means for selectively passing said combustion air through said heat exchanger means to provide said combustion air at a given optimum temperature prior to entry into a combustion chamber of the engine in accordance with the respective operational situation.

* * * * *